Nov. 30, 1926.  
H. H. BOYCE  
1,608,577
INDICATING INSTRUMENT FOR AUTOMOBILE RADIATOR CAPS AND THE LIKE
Filed Oct. 31, 1917
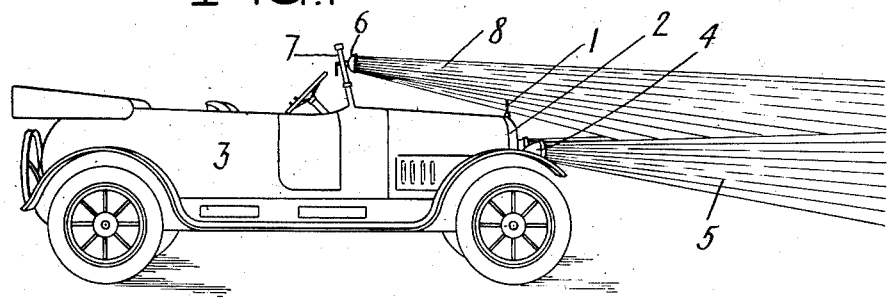
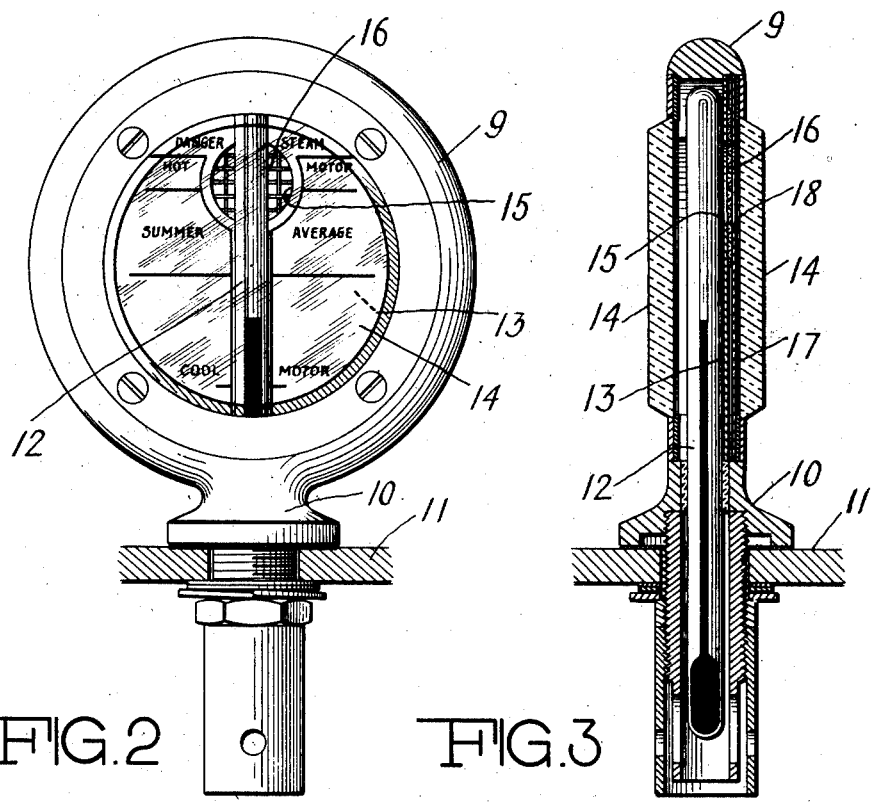
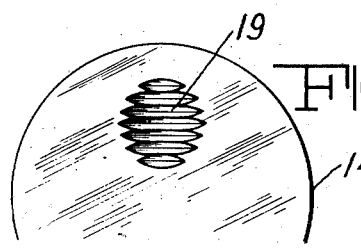

Patented Nov. 30, 1926.

1,608,577

UNITED STATES PATENT OFFICE.

HARRISON HURLBERT BOYCE, OF FOREST HILLS, NEW YORK.

INDICATING INSTRUMENT FOR AUTOMOBILE RADIATOR CAPS AND THE LIKE.

Application filed October 31, 1917. Serial No. 199,413.

This invention relates to the construction of indicating instruments adapted to be mounted on the radiators or radiator caps of automobiles or any other locations where similar conditions might exist. In my Patent No. 1,275,654 I have disclosed an instrument for indicating engine temperatures adapted to be mounted on the radiator cap of an automobile and so constructed as to be readable from the driver's seat. One feature of such an instrument which is claimed particularly in the aforesaid patent relates to the construction of an instrument with a window or opening across which the liquid indicating column or other indicating member is adapted to pass so as to throw into relief the indications of the instrument and render it more easily readable, particularly at night. With this construction, however, I find that in some cases where side lights or spot lights are used which illuminate the face of the instrument, the indicating element of the latter is less clearly visible when in front of the window. The present invention relates particularly to a construction for facilitating the reading of an instrument when lighted by a direct illumination thrown on its face as well as by observation of the same when lighted from the other side of it.

In the accompanying drawings in which I have shown a specific form of the invention as illustrative of the principle thereof and of the best mode now known to me of practicing the invention, Figure 1 is a diagrammatic view illustrating the instrument applied to an automobile radiator, and showing the distribution of the light rays from the headlights and a spotlight. Figure 2 is a face view of the instrument. Figure 3 is a vertical sectional view of the instrument. Figure 4 is a face view of a form of glass crystal which may be employed in carrying out the invention.

Referring to the drawings in detail, the numeral 1 designates an instrument which is adapted to be mounted in a prominent place in front of the driver of the vehicle, ordinarily on top of the radiator 2 of the automobile 3. In the daytime the instrument is directly in front of and plainly visible to the driver of the vehicle. At night, however, in order that the instrument may be read, use is preferably made of the usual lights on the automobile, and the instrument should be so constructed as to be readable with the aid of these sources of illumination. At the present time the lamp equipment of an automobile comprises in practically all cases headlights 4 located alongside of or usually slightly in front of the automobile radiator 2, these lights casting a beam illustrated diagrammatically by the lines 5, and in many cases another source of light located between the driver and the instrument on the radiator cap, such as the well-known sidelights, or, as is perhaps even more common at the present day, a spotlight 6 located on the wind shield 7, or other suitable support. The spotlight throws a beam of the character indicated by the lines 8.

In my patent above referred to, I have disclosed an instrument provided with a window which permits the driver to see through the instrument so that the indicating element of the latter is silhouetted against the beam of light 5 thrown by the headlights. A preferred construction of instrument for this purpose is illustrated in Figures 2 and 3, in which the instrument comprises a frame 9 having a base 10 adapted to be clamped on the radiator cap 11, the indicating element of the instrument comprising a glass tube thermometer 12 extending across the frame 9. At the side of the glass tube away from the driver's seat is a dial plate 13, the glass tube and dial plate being in the construction illustrated enclosed between glass crystals 14. In the dial plate is the opening or window 15 hereinbefore referred to, which preferably has an area substantially larger than the area of the adjacent portion of the thermometer tube. The side of the thermometer tube adjacent to the dial plate may be whitened in the manner usual in thermometer construction, so as to throw the indicating column into relief, but this whitening preferably terminates at the lower edge of the window 15 so as not to interfere with the transparency of the tube where it crosses the window. When the headlights only are lighted, the indicating column will be silhouetted against the window, and when the indicating liquid passes partly or wholly across the window, it may be readily observed against the beam from the headlights. In case a source of illumination is employed between the driver and the instrument, such, for example, as the spotlight 6, this light shining upon the instrument face diminishes or destroys the silhouetting effect referred to, and as there is no white background or its equivalent behind that part of the tube crossing the window, the position of the column of indicating liquid is in many cases rendered difficult of observation.

The present invention relates to means for obviating this difficulty, and I have discovered that I can accomplish this result by locating in the window a medium which catches the light rays from the spotlight or other source of illumination in front of the instrument or coming from the direction of the driver's seat, so as to form an illuminated background for the indicating column, and which medium at the same time will not interfere substantially with the silhouetting of the column against the beam from the headlights, in case the spotlight or other intermediate source of illumination is not employed. A medium for this purpose which I have found to be particularly efficacious, comprises a series of wires, or a screen, located in the window. Preferably I employ an ordinary wire screen of about the mesh of a common fly screen, and made of galvanized or white-painted wires. The whitish color, such as that characteristic of galvanized metal, appears to be particularly effective in catching the light rays and reflecting them onto the thermometer tube, and possesses a high degree of visibility without causing confusing reflections. In the specific construction illustrated, the screen is shown at 16, and is supported by being clamped between the dial plate 13 and a back plate 17 which has a window opening 18 therein, registering with the window 15 in the dial plate.

While I have found the use of the screen as described to be a very satisfactory and also a cheap and practical mode of accomplishing the desired result, other means for catching the light rays and forming a transparent or translucent background may be employed, such, for instance, as the construction shown in Figure 4. As here illustrated, the crystal 14 back of the window is provided with a grooved area 19 producing practically a series of prisms, which form a background while at the same time permitting the silhouetting of the indicating column against the headlight beam when there is no direct illumination of the face of the instrument.

While I have illustrated and described in detail certain preferred embodiments of my invention, it is to be understood that my invention is not limited to such constructions. I therefore intend to cover the invention broadly, in whatever form its principle may be employed.

Having thus described my invention, I claim:

1. The combination with an automobile radiator, of an instrument mounted thereon for indicating thermal conditions in the radiator, said instrument including an indicating element and a protective casing therefor, said casing having a window therethrough, and means in said window on the side of said indicating element away from the driver's seat of the automobile for utilizing light received from either the front or the rear of the instrument to form a luminous background for the indicating element and thereby facilitate reading of the instrument.

2. The combination with an automobile radiator of an instrument mounted thereon for indicating thermal conditions in the radiator, said instrument including an indicating element and a protective casing therefor, said casing having a window therethrough, and means in said window on the side of said indicating element away from the driver's seat of the automobile for utilizing light received from either the front or the rear of the instrument to form a luminous background for the indicating element and thereby facilitate reading of the instrument, said means being substantially co-extensive in area with the area of said window.

3. The combination with an automobile radiator of an instrument mounted thereon for indicating thermal conditions in the radiator, said instrument including a glass tube thermometer and a protective casing therefor, said casing having a window therethrough, and a screen in said window on the side of said thermometer tube away from the driver's seat of the automobile.

4. In an instrument adapted to be mounted upon an automobile radiator, the combination of a frame, a glass tube thermometer carried by said frame, a dial plate carried by said frame at the side of said thermometer tube intended to be remote from the driver's seat of the automobile, said plate having a window therein, and a screen extending across said window, said screen being of a dull whitish color.

5. In an instrument adapted to be mounted upon an automobile radiator, the combination of a frame, a glass tube thermometer carried by said frame, a dial plate carried by said frame at the side of said thermometer tube intended to be remote from the driver's seat of the automobile, said plate having a window therein, and a screen extending across said window.

6. The combination with an automobile radiator of an instrument mounted thereon for indicating thermal conditions in the radiator, said instrument including an indicating element and a protective casing therefor, said casing having therethrough a window, the area of which is substantially larger than the area of the adjacent portion of the indicating element, and means in said window on the side of said indicating element away from the driver's seat of the automobile for utilizing light received from either the front or the rear of the instrument to form a luminous background for the indicating element and thereby facilitate reading of the instrument, said means being substantially co-extensive in area with the area of said window.

HARRISON HURLBERT BOYCE.